(12) United States Patent
Rolka et al.

(10) Patent No.: US 10,843,592 B2
(45) Date of Patent: Nov. 24, 2020

(54) COLLISION IMPACT FORCE REDUCTION METHOD AND SYSTEM

(71) Applicant: Volvo Car Corporation, Gothenburg (SE)

(72) Inventors: Lucas Rolka, Gothenburg (SE); Martin Ostergren, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 71 days.

(21) Appl. No.: 16/177,526

(22) Filed: Nov. 1, 2018

(65) Prior Publication Data

US 2019/0143846 A1 May 16, 2019

(30) Foreign Application Priority Data

Nov. 13, 2017 (EP) .................................... 17201292

(51) Int. Cl.
*B60N 2/00* (2006.01)
*B60N 2/02* (2006.01)
(Continued)

(52) U.S. Cl.
CPC ........... *B60N 2/0276* (2013.01); *B60N 2/002* (2013.01); *B60R 21/0134* (2013.01);
(Continued)

(58) Field of Classification Search
CPC ............................. B60N 2/0276; B60N 2/002; B60R 21/01552; B60R 21/01554;
(Continued)

(56) References Cited

U.S. PATENT DOCUMENTS

| 6,422,595 B1 * | 7/2002 | Breed .................... B60N 2/002 280/735 |
| 2002/0158453 A1 | 10/2002 | Levine |
| 2003/0079929 A1 | 5/2003 | Takagi et al. |

FOREIGN PATENT DOCUMENTS

| DE | 102011122203 A1 * | 6/2013 | ........... B60N 2/0232 |
| DE | 102011122203 A1 | 6/2013 | |

(Continued)

OTHER PUBLICATIONS

Translation of DE102011122203A1 accessed at espacenet.com. Accessed date: Mar. 7, 2020 (Year: 2013).*

(Continued)

*Primary Examiner* — Ruth Ilan
*Assistant Examiner* — Hilary L Johns
(74) *Attorney, Agent, or Firm* — Clements Bernard Walker; Christopher L. Bernard (57) ABSTRACT

The present disclosure relates to a method for collision impact force reduction for a vehicle. The method comprises determining a smallest relative distance (D) between a head of a driver of the vehicle and a steering wheel assembly comprising an airbag of the vehicle, obtaining information of an imminent collision, the collision being at least partly frontal, comparing (300) the smallest relative distance (D) to a pre-defined threshold, and, when said smallest relative distance (D) is equal to or less than said pre-defined threshold, initiating a forward displacement of a driver seat of the vehicle and a retraction of the steering wheel assembly comprising an airbag, preferably a retraction along the steering column of the steering wheel assembly.

17 Claims, 3 Drawing Sheets

(51) Int. Cl.
    *B60R 21/0134*     (2006.01)
    *B60R 21/015*     (2006.01)
    *B60R 21/01*     (2006.01)
    *B60R 21/00*     (2006.01)
    *B60R 21/013*     (2006.01)

(52) U.S. Cl.
    CPC .. *B60R 21/01552* (2014.10); *B60R 21/01554* (2014.10); *B60R 2021/0004* (2013.01); *B60R 2021/0032* (2013.01); *B60R 2021/0048* (2013.01); *B60R 2021/0102* (2013.01); *B60R 2021/01211* (2013.01); *B60R 2021/01252* (2013.01); *B60R 2021/01315* (2013.01)

(58) Field of Classification Search
    CPC ........ B60R 21/0134; B60R 2021/0004; B60R 2021/0032; B60R 2021/0048; B60R 2021/0102; B60R 2021/01211; B60R 2021/01252; B60R 2021/01315

USPC ........................................................ 280/735
See application file for complete search history.

(56) References Cited

FOREIGN PATENT DOCUMENTS

| | | |
|---|---|---|
| EP | 2105356 A1 | 9/2009 |
| EP | 3018011 A1 | 5/2016 |

OTHER PUBLICATIONS

Apr. 18, 2018 European Search Report issue on International Application No. EP17201292.

\* cited by examiner

COLLISION IMPACT FORCE REDUCTION METHOD AND SYSTEM

CROSS-REFERENCE TO RELATED APPLICATION

The present patent application/patent claims the benefit of priority of co-pending European Patent Application No. 17201292.4, filed on Nov. 13, 2017, and entitled "COLLISION IMPACT FORCE REDUCTION METHOD AND SYSTEM," the contents of which are incorporated in full by reference herein.

TECHNICAL FIELD

The present disclosure relates to a method for collision impact force reduction for a vehicle. The disclosure further relates to a collision impact force reduction system for a vehicle. The disclosure also relates to vehicle comprising a collision impact force reduction system.

BACKGROUND

Vehicles of today are commonly equipped with several passive safety functions that serve the purpose of ameliorating and/or preventing injuries to a driver of a vehicle in case the vehicle is involved in a collision.

During a collision, e.g. a frontal collision, the driver of a vehicle is subjected to great forces. This is mainly due to the drastic and high reduction in velocity of the vehicle during the collision. Passive safety systems, such as a seat belt or an airbag, act so as to retain a driver of a vehicle in the driver seat and prevent the driver from hitting the interior of the vehicle during the fast velocity reduction of the colliding vehicle. To this end, the use of such safety systems has proven successful in reducing the risk of serious injury to the driver. However, the strain that the body of a driver of a vehicle is subjected to during a collision and from the subsequent acting upon the driver from the safety systems may still be significant and may result in injuries to the driver.

Thus, following the above, there remains a desire for improved passive safety functions and systems which further reduce the risk of injury to the driver of a vehicle during a collision.

SUMMARY

The object of the present disclosure is to overcome or ameliorate at least one of the disadvantages of the prior art, or to provide a useful alternative. Thus, it is an object of the present disclosure to provide a method and system that can reduce the impact force to which a driver of a vehicle is subjected during a collision.

The above object may be achieved by the subject-matter of claims 1 and 8. Embodiments are set forth in the appended dependent claims, in the following description and in the drawings.

Thus, the present disclosure relates to a method for collision impact force reduction for a vehicle. The method comprises:
 determining a smallest relative distance between a head of a driver of the vehicle and a steering wheel assembly comprising an airbag of the vehicle,
 obtaining information of an imminent collision, the collision being at least partly frontal,
 comparing the smallest relative distance to a pre-defined threshold,
 when the smallest relative distance is equal to or less than the pre-defined threshold, and
 initiating a forward displacement of a driver seat of the vehicle and a retraction of the steering wheel assembly comprising an airbag, preferably a retraction along a steering column of the steering wheel assembly.

As known from the prior art, the following typically takes place in a vehicle when a frontal collision occurs. Upon establishing that a frontal collision that cannot be avoided is pending, the seatbelt of a driver of the vehicle is further secured by pre-tensioning. The steering wheel airbag is inflated in response to the collision, and is intended for the head and upper body of the driver to reach. As such, the pelvic region of the driver is fixated in the seat, by the seatbelt, while the head and upper body of the driver is lunged forward during the frontal collision, putting great strain on the body of the driver.

A method as described herein implies that, upon obtaining information of an imminent and at least partly frontal collision, an initiation of a forward displacement of the driver seat and a retraction of the steering wheel assembly comprising an airbag are controlled by the determined smallest relative distance between the head of a driver of the vehicle and the steering wheel assembly comprising an airbag of the vehicle, such that the initiation occurs when the determined smallest relative distance is equal to or less than a pre-defined threshold. This will have the positive effect that the driver, retained in the driver seat by the seatbelt, will be moved forward due to the forward displacement of the driver seat. Also the steering wheel assembly comprising the assumed inflated airbag due to the collision is displaced, by being retracted towards the dashboard, in order to follow the forward displacement of the driver and driver seat. Thereby the movement of the driver will not be hindered by the steering wheel assembly. In this way, the strain on the body of the driver due to the collision can be reduced.

There is hence provided an advantageous effect of determining a relative distance between the head of the driver and the steering wheel assembly. Further advantageous, by utilizing a pre-defined threshold of the determined smallest distance for the initiation, a desired effect of reducing the impact force to which the driver is subjected during a collision can be achieved.

The method may be performed by a system, e.g. as described herein.

The control of the forward displacement of the whole body of the driver during a frontal collision according to the method as described herein, has the positive effect of providing an increased distance for the body of the driver during which a deceleration of the body can take place. Prior to the collision, the body of the driver of the vehicle travels at the velocity of the vehicle. Due to the collision a rapid deceleration of the vehicle takes place, however due to inertial forces at least the head and/or upper body of the driver will be urged to travel at a velocity relative to the rapidly decelerating vehicle. Consequently, it is advantageous to initiate a forward displacement of the driver, i.e. by means of the driver seat, and to retract the steering wheel assembly, according to the method as described herein as long as the head and/or upper body of the driver has not yet again reached a zero relative velocity in relation to the vehicle, i.e. as long as the head and/or upper body of the driver do/does not travel at the velocity of the vehicle after the collision.

As described herein, the steering wheel assembly comprises an airbag. It is assumed that the airbag will inflate due to the imminent collision in a manner known from the prior art, and thus, a smallest relative distance between the head of a driver of the vehicle and the steering wheel assembly is determined taking an inflated airbag into account. In other words, the airbag will inflate due to the collision, and being part of the steering wheel assembly, the smallest relative distance will be determined between the head of a driver and the inflated airbag of the steering wheel assembly.

In a normal driving position and thus prior to an imminent collision, the driver of the vehicle is seated facing the steering wheel assembly at a distance, thus, a relative distance between the head of the driver and the steering wheel assembly is defined as positive in this situation. However, during a collision, the relative distance will decrease, as the head and upper body of the driver is being lunged forward, and thereby approach the inflated airbag of the steering wheel assembly. At the point where the head reaches the inflated airbag the relative distance will have a zero value, and as the head continues to move, into the airbag, the relative distance will have a negative value. Hence, the determined smallest relative distance being equal to or less than the pre-determined threshold may involve a negative value of the relative distance.

As described herein, the collision is defined as being at least partly frontal. Hence, it may involve a full frontal collision or a semi-frontal collision of various degrees. Consequently, it involves a main direction of collision which will urge a movement of the driver in a main forward direction relative to the vehicle interior.

By a forward direction is meant a direction along the longitudinal extension of the vehicle from the rear of the vehicle to the front of the vehicle, the vehicle being positioned on the ground, and thus an extension substantially parallel to the ground. To this end, a forward displacement of the driver seat means a translation of the seat towards the front of the vehicle. The steering wheel assembly is displaced towards the dashboard, preferably by being retracted along the steering column of the steering wheel.

The pre-defined threshold may be in the range of 0 to 20 cm, preferably 0 to 10 cm, more preferably 0 to 5 cm, most preferably 0 to 1 cm.

Optionally, the pre-defined threshold may be 0 cm, or substantially 0 cm. This corresponds to that the point at which the head of a driver will reach an assumed inflated airbag of the steering wheel assembly due to the collision is set as the threshold for initiation of the displacement of the driver seat and steering wheel assembly. This has the advantage that, when the head of a driver of the vehicle has reached the inflated airbag, or when the head has started to deflate the airbag, the displacement of the driver seat and the steering wheel assembly will allow the driver to continue to move forwards, while still deflating the airbag and thereby reducing driver's forward-moving energy. This will have the positive effect that the driver, retained in the driver seat by the seatbelt, will, after reaching the inflated airbag of the steering wheel assembly, continue to be moved forwards due to the forward displacement of the driver seat of the vehicle. Further, also the steering wheel assembly is displaced, by being retracted towards the dashboard, in order to accompany the forward displacement of the driver and driver seat.

Optionally, the method may comprise carrying out the determination of the smallest relative distance between the head of a driver of the vehicle and the steering wheel assembly comprising an airbag of the vehicle continuously during driving of the vehicle. As such, the relative distance may be determined all the time during driving of the vehicle at a pre-determined frequency, for example in the range of from 50 Hz to 200 Hz, preferably at a highest frequency possible for the system. As a complement, the determination of the smallest relative distance may be set to be carried out continuously first when the vehicle velocity exceeds a pre-determined minimum value, for example 20 or 30 or 40 or 50 km/h. In this way, the continuous determination of the smallest relative distance is carried out at vehicle velocities for which it is assumed to be likely that the collision impact force reduction method will be relevant to use.

The continuous determination a smallest relative distance is advantageous since timing of initiating the displacement of the driver seat and steering wheel assembly is important in order to achieve the positive effects of the present invention. By means of continuously determining a smallest relative distance between the head of a driver of the vehicle and the steering wheel assembly, it is ensured that the timing for initiating the displacement of the driver seat and steering wheel assembly is known at the time of impact. This timing has the positive effect of reducing the force on the body of the driver during a frontal collision.

Optionally, the method may comprise obtaining information comprising the position(s) of the head of a driver of the vehicle and/or the steering wheel assembly and, on the basis of the information, carrying out the determination of the smallest relative distance between the head of a driver of the vehicle and the steering wheel assembly comprising an airbag of the vehicle.

The information comprising the positions may be obtained from a vehicle information system possibly primarily intended for other purposes, but which may also be used for the purposes of determining the smallest relative distance between the head of a driver of the vehicle and the steering wheel assembly. In this way, position data may be easily available.

The information may be received from a vehicle interior sensor set comprising at least one sensor, wherein the vehicle interior sensor set is adapted to determine the position(s) of the head of a driver of the vehicle and/or the steering wheel assembly.

Optionally, the vehicle interior sensor set may comprise sensors located at two different positions inside the vehicle interior. In this way, the position of the head of a driver of the vehicle may be calculated with respect to the vehicle interior. Purely by way of example, two eye movement sensors, each eye movement sensor being adapted to locate eye movement and thereby the two sensors can position the head in a three dimensional space.

Optionally, or as a complement, a vehicle interior sensor set as disclosed herein may comprise sensors of the kind known from prior art such as IR sensors, thermal sensors and optical sensors, i.e. cameras.

The above approach is further advantageous since determination of the positions of the head of a driver of a vehicle and the steering wheel assembly may be obtained from sensors possibly primarily intended for other purposes and thus being available in the vehicle at no extra cost, but which may also be used for the determination of a smallest relative distance between the head of a driver of the vehicle and the steering wheel assembly.

Optionally, the steering wheel assembly and the driver seat of the vehicle may be displaced at least partly simultaneously, preferably synchronized. The driver seat and the steering wheel assembly may be displaced synchronized, i.e. at a similar velocity and/or a similar distance. By way of example, the displacement of the driver seat may be initiated prior to the retraction of the steering wheel assembly. Further, the displacement of the driver seat and retraction of the steering wheel assembly respectively may end at different time points. However for at least a part of the displacements both the driver seat and the steering wheel assembly move. The steering wheel assembly may preferably not be displaced at a lower velocity than the velocity of the head and/or upper body of the driver when the head of the driver has reached the inflated airbag. The driver seat and the steering wheel assembly may be displaced simultaneously, e.g. when the head of the driver reaches the inflated airbag of the steering wheel assembly. In this way, the strain on the body of the driver is reduced.

Determining a smallest relative distance as described herein may be regarded as equivalent to determining a point in time. The method as described herein may then comprise,     obtaining vehicle state information, the vehicle state information comprising at least a velocity of the vehicle and information on an imminent frontal collision,     determining a point of time, on the basis of the smallest relative distance and the vehicle state information, when the head of a driver of the vehicle will reach the steering wheel assembly comprising an airbag assuming the imminent frontal collision at the vehicle velocity, and     initiating a forward displacement of a driver seat of the vehicle and a retraction of the steering wheel assembly comprising an airbag of the vehicle, preferably a retraction along a steering column of the steering wheel assembly, during a time interval from when the airbag of the steering wheel assembly has started to inflate to the determined point of time.

Providing the determined relative distance between the head of a driver of the vehicle and the steering wheel assembly comprising an airbag of the vehicle according to the method as described herein, and obtaining information of the vehicle velocity at the assumed collision instance, the point of time when the head of a driver of the vehicle will reach the inflated airbag due to the assumed collision may be calculated. Thus, the point of time may be utilized for timing the initiation of the forward displacement of the driver seat of the vehicle and the retraction of the steering wheel assembly comprising an airbag of the vehicle.

The present disclosure further relates to a collision impact force reduction system for a vehicle. The system is adapted to:

determine a smallest relative distance between a head of a driver of the vehicle and a steering wheel assembly comprising an airbag of the vehicle,     obtain information of an imminent frontal collision, the collision being at least partly frontal,     compare the smallest relative distance to a pre-defined threshold,     when the smallest relative distance is equal to or less than the pre-defined threshold, and     initiate a forward displacement of a driver seat of the vehicle and a retraction of the steering wheel assembly comprising an airbag, preferably a retraction along a steering column of the steering wheel assembly.

A system as described herein implies that, upon obtaining information of an imminent and at least partly frontal collision, an initiation of a forward displacement of the driver seat and a retraction of the steering wheel assembly comprising an airbag are controlled by the determined smallest relative distance between the head of a driver of the vehicle and the steering wheel assembly comprising an airbag of the vehicle, such that the initiation occurs when the determined smallest relative distance is equal to or less than a pre-defined threshold. This will have the positive effect that the driver, retained in the driver seat by the seatbelt, will be moved forwards due to the forward displacement of the driver seat. Also the steering wheel assembly comprising the assumed inflated airbag due to the collision is displaced, by being retracted towards the dashboard, in order to follow the forward displacement of the driver and driver seat. Thereby the movement of the driver will not be hindered by the steering wheel assembly. In this way, the strain on the body of the driver due to the collision can be reduced.

There is provided an advantageous effect of determining a relative distance between the head of the driver and the steering wheel assembly. Further advantageous, by utilizing a pre-defined threshold of the determined smallest distance for the initiation, a desired effect of reducing the impact force to which the driver is subjected during a collision can be achieved.

Optionally, the system may comprise one or more of a determination unit being adapted to determine the smallest relative distance between the head of a driver of the vehicle and the steering wheel assembly comprising an airbag of the vehicle,     a receiving unit being adapted to obtain information of an imminent collision, the collision being at least partly frontal,     a processing unit being adapted to compare the smallest relative distance to a pre-defined threshold and to determine when the smallest relative distance is equal to or less than the pre-defined threshold, and     a control unit being adapted initiate the forward displacement of the driver seat of the vehicle and the retraction of the steering wheel assembly comprising an airbag, preferably a retraction along the steering column of the steering wheel assembly.

The collision impact force reduction system may initiate the displacements by sending an information signal to one or more vehicle system(s) which is/are adapted to control the displacements of the driver seat and/or steering wheel assembly.

The pre-defined threshold may be in the range of 0 to 20 cm, preferably 0 to 10 cm, more preferably 0 to 5 cm, most preferably 0 to 1 cm.

Optionally, the pre-defined threshold may be 0 cm, or substantially 0 cm.

Optionally, the collision impact force reduction system may be adapted to determine the smallest relative distance between the head of a driver of the vehicle and the steering wheel assembly comprising an airbag of the vehicle continuously during driving of the vehicle. As such, the relative distance may be determined all the time during driving of the vehicle, for example at a frequency in the range of from 50 Hz to 200 Hz. The smallest relative distance may be determined at a highest frequency possible for the system. As a complement, the determination of the smallest relative distance may be set to be carried out continuously first when the vehicle velocity exceeds a pre-determined minimum value, for example 20 or 30 or 40 or 50 km/h. In this way, the continuous determination of a smallest relative distance is carried out at vehicle velocities for which it is assumed to be likely to activate the collision impact force reduction system.

The collision impact force reduction system may be adapted to obtain information comprising the position(s) of the head of a driver of the vehicle and/or the steering wheel assembly comprising an airbag of the vehicle and, on the basis of the information, determine the smallest relative distance between the head of a driver of the vehicle and the steering wheel assembly comprising an airbag of the vehicle.

The information comprising the positions may be obtained from a vehicle information system possibly primarily intended for other purposes and thus being available in the vehicle at no extra cost, but which may also be used for the purposes of determining a smallest relative distance between the head of a driver of the vehicle and the steering wheel assembly. In this way, position data may be easily available.

Optionally, the collision impact force reduction system may comprise a vehicle interior sensor set comprising at least one vehicle sensor. The collision impact force reduction system may in this case be adapted to receive the information from the vehicle interior sensor set, the vehicle interior sensor set being adapted to determine the position(s) of the head of a driver of the vehicle and/or the steering wheel assembly comprising an airbag of the vehicle.

Optionally, the vehicle interior sensor set may comprise sensors located at two different positions inside the vehicle interior. In this way, the position of the head of a driver of the vehicle may be calculated with respect to the vehicle interior. Purely by way of example, two eye movement sensors may be utilized to position the head of a driver with respect to the vehicle interior, each eye movement sensor being adapted to locate eye movement and thereby the two sensors can position the head in a three dimensional space.

Optionally or as a complement, a vehicle interior sensor set as disclosed herein may comprise sensors of the kind known from prior art such as IR sensors, thermal sensors and optical sensors, i.e. cameras.

Optionally, the collision impact force reduction system may be adapted to displace the steering wheel assembly comprising an airbag and the driver seat of the vehicle at least partly simultaneously, preferably synchronized. The driver seat and the steering wheel assembly may be displaced synchronized, i.e. at a similar velocity and/or a similar distance. By way of example, the displacement of the driver seat may be initiated prior to the retraction of the steering wheel assembly. Further, the displacement of the driver seat and retraction of the steering wheel assembly respectively may end at different time points. However for at least a part of the displacements the driver seat and the steering wheel assembly both move. The steering wheel assembly may preferably not be displaced at a lower velocity than the velocity of the head and/or upper body of the driver when the head of the driver has reached the inflated airbag. The driver seat and the steering wheel assembly may be displaced simultaneously, e.g. when the head of the driver reaches the inflated airbag of the steering wheel assembly. In this way, the strain on the body of the driver is reduced.

The present disclosure also relates to a vehicle comprising a collision impact force reduction system as disclosed herein.

BRIEF DESCRIPTION OF THE DRAWINGS

The present invention will hereinafter be further explained by means of non-limiting examples with reference to the appended drawings wherein.

It should be noted that the appended drawings are not necessarily drawn to scale and that the dimensions of some features of the present invention may have been exaggerated for the sake of clarity.

DETAILED DESCRIPTION

The invention will, in the following, be exemplified by embodiments. It should however be realized that the embodiments are included in order to explain principles of the invention and not to limit the scope of the invention, as defined by the appended claims. Details from two or more of the embodiments may be combined with each other.

Figure 1A:
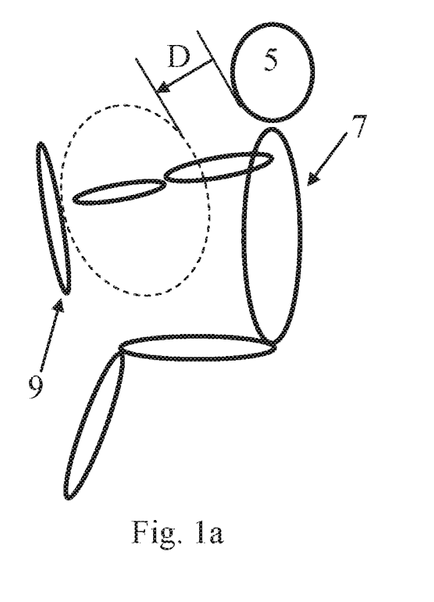
FIG. 1a illustrates a scenario during driving of a vehicle.
Figure 1B:
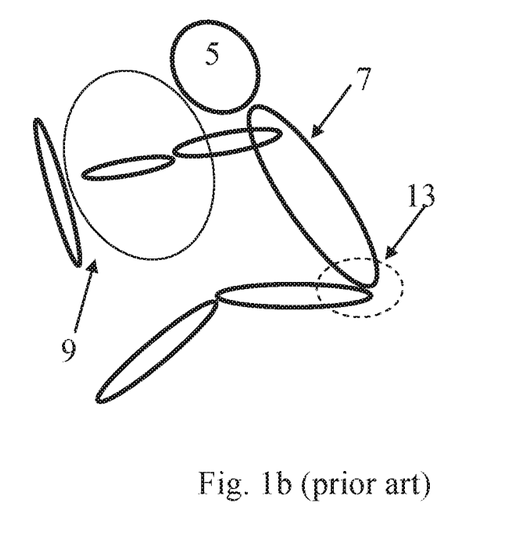
FIG. 1b illustrates a frontal collision scenario known from prior art.
Figure 1C:
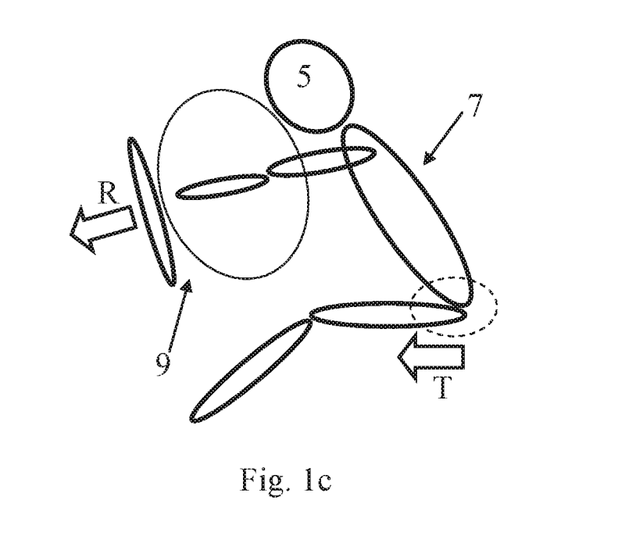
FIG. 1c illustrates a frontal collision scenario according to the present disclosure.

The present disclosure and its advantage over the prior art will be further explained with reference to FIGS. 1a, 1b and 1c. A driver 7 of a vehicle is depicted in FIGS. 1a, 1b, and 1c. The driver 7 is assumed seated in a driver seat of the vehicle and retained by a seatbelt, neither the driver seat nor the seatbelt are illustrated. The vehicle in which the driver 7 is assumed seated in is assumed standing on flat ground or going at a steady velocity. Directions as used herein relate to known extensions and directions of a vehicle. As such, a forward direction T is along the longitudinal horizontal extension of the vehicle from the rear of the vehicle to the front of vehicle, see FIG. 1c. Further, it is illustrated a steering wheel assembly 9 comprising an airbag, which airbag is illustrated with a dotted line in FIG. 1a since during normal driving the airbag is not inflated. The airbag is intended to be inflated during a collision, which is illustrated in FIGS. 1b and 1c. In FIG. 1a the position of the driver 7 during normal driving and prior to a collision is schematically illustrated.

As known from the prior art, the following typically takes place in a vehicle when a frontal collision occurs, see FIG. 1b. Upon establishing that a frontal collision that cannot be avoided is pending, the seatbelt of the driver 7 of the vehicle is further secured by pre-tensioning. The steering wheel assembly airbag is inflated in response to the collision, and intended for the head 5 and/or upper body of the driver 7 to reach. The pelvic region 13 of the driver 7 is fixated in the seat, by the seatbelt, while the head 5 and upper body of the driver is lunged forward during the frontal collision, putting great strain on the body of the driver 7, see FIG. 1b.

If utilizing a method and/or a system according to the present disclosure, see FIG. 1c, when the smallest relative distance D between the head 5 of a driver 7 of the vehicle and the steering wheel assembly 9 comprising the airbag, in FIG. 1a illustrated for an inflated airbag, is equal to or less than a pre-defined threshold, the driver seat is translated forwards along the direction T, towards the dashboard, while at the same time the steering wheel assembly 9 comprising the airbag is retracted along the direction of the steering column R, i.e. towards the dashboard, in order to accompany the forward displacement of the driver 7 and driver seat. Thereby the movement of the driver 7 will not be hindered by the steering wheel assembly 9. Hence, the whole body of the driver 7 of the vehicle, including the pelvic region 13, fixated to the driver seat, will move forward, see FIG. 1c. This will have the positive effect of reducing the strain the body of the driver 7 is subjected to during a frontal collision.

Figure 2:
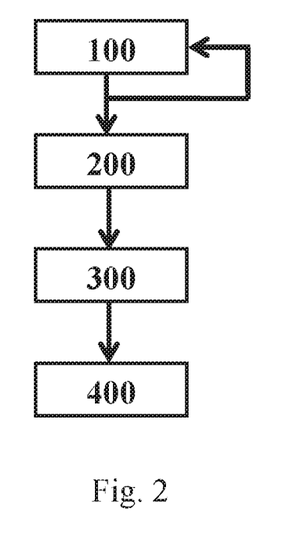
FIG. 2 illustrates a method according to the present disclosure.

FIG. 2 illustrates a method for collision impact force reduction for a vehicle according to the present disclosure. See also FIGS. 1a to 1c for references. The method comprises:

determining 100 a smallest relative distance D between a head 5 of a driver 7 of the vehicle and a steering wheel assembly 9 comprising an airbag of the vehicle,     obtaining 200 information of an imminent collision, the collision being at least partly frontal,     comparing 300 the smallest relative distance D to a pre-defined threshold,     when the smallest relative distance D is equal to or less than the pre-defined threshold, and     initiating 400 a forward displacement of a driver seat of the vehicle and a retraction of the steering wheel assembly 9 comprising an airbag of the vehicle, preferably a retraction along a steering column of the steering wheel assembly 9.

The method as described herein, as mentioned above, implies that upon obtaining information of an imminent and at least partly frontal collision, an initiation of a forward displacements of the driver seat and a retraction of the steering wheel assembly 9 comprising an airbag are controlled by the determined smallest relative distance D between a head 5 of a driver 7 of the vehicle and the steering wheel assembly 9 comprising an airbag of the vehicle, such that the initiation occurs when the determined smallest relative distance D is equal to or less than a pre-defined threshold.

As illustrated in FIGS. 1a to 1c, the steering wheel assembly 9 comprises an airbag. It is assumed that the airbag will inflate due to the imminent collision in a manner known from the prior art, and thus, a smallest relative distance D between the head of a driver of the vehicle and the steering wheel assembly 9 is determined taking an inflated airbag into account, see FIG. 1a.

In a normal driving position and thus prior to a collision, see FIG. 1a, the driver 7 of the vehicle is seated facing the steering wheel assembly 9 at a distance, thus, the relative distance D between the head 5 of the driver and the steering wheel assembly 9 is defined as positive in this situation. However, during a collision, the relative distance D will decrease, as the head 5 and/or upper body of the driver 7 is being lunged forward, and thereby approach the inflated airbag of the steering wheel assembly 9. At the point where the head reaches the inflated airbag the relative distance will have a zero value, and as the head continues to move, into the airbag (not illustrated), the relative distance will have a negative value. Hence, the determined smallest relative distance D being equal to or less than the pre-determined threshold may involve a negative value of the relative distance.

The method in FIG. 2 is illustrated as determining the smallest relative distance D between the head 5 of a driver 7 of the vehicle and the steering wheel assembly 9 comprising an airbag of the vehicle continuously during driving of the vehicle, indicated by the arrow leading back to square 100. Hence, the relative distance is determined all the time during driving of the vehicle, e.g. at a frequency in the range of from 50 Hz to 200 Hz. The smallest relative distance D may be determined at a highest frequency possible for the system. Further, the determination of the smallest relative distance can be set to be carried out continuously first when the vehicle velocity exceeds a pre-determined minimum value, for example 20 or 30 or 40 or 50 km/h. In this way, the continuous determination of a smallest relative distance D is carried out at vehicle velocities for which it is assumed to be desirable to activate the collision impact force reduction method.

The pre-defined threshold can be in the range of 0 to 20 cm, preferably 0 to 10 cm, more preferably 0 to 5 cm, most preferably 0 to 1 cm.

Optionally, the pre-defined threshold is set to 0 cm, or substantially 0 cm. This corresponds to that the point at which the head of the driver will reach an assumed inflated airbag of the steering wheel assembly due to the collision, is set as the threshold for initiation of the displacements of the driver seat and steering wheel assembly.

The control of the forward displacement of the whole body of the driver 7 of the vehicle during the collision according to the method as described herein, has the positive effect of providing an increased distance for the body of the driver 7 during which a deceleration of the body can take place. The forward displacement of the driver 7, i.e. by means of the driver seat, and retraction of the steering wheel assembly 9 comprising an airbag, according to the method as described herein is advantageously initiated as long as the head and/or upper body of the driver 7 has not yet again reached a zero relative velocity in relation to the vehicle, i.e. as long as the head 5 and/or upper body of the driver 7 do/does not travel at the velocity of vehicle after the collision.

Optionally, the method comprises obtaining information comprising the position(s) of the head 5 of a driver 7 of the vehicle and/or the steering wheel assembly 9 comprising an airbag and, on the basis of the information, carrying out the determination of the smallest relative distance D between a head 5 of a driver 7 of the vehicle and a steering wheel assembly 9 of the vehicle.

By way of example, the information is received from a vehicle interior sensor set 11, 11' comprising at least one sensor. The vehicle interior sensor set 11, 11' is then adapted to determine the position(s) of the head of a driver of the vehicle and/or the steering wheel assembly, which is further described below in conjunction with FIGS. 3a and 3b.

By way of another example, the information comprising the position(s) is obtained from a vehicle information system possibly primarily intended for other purposes, but which may also be used for the purposes of determining a smallest relative distance D between the head 5 of a driver 7 of the vehicle and the steering wheel assembly 9.

The steering wheel assembly 9 comprising an airbag and the driver seat of the vehicle are displaced at least partly simultaneously, preferably synchronized. The driver seat and the steering wheel assembly 9 can be displaced synchronized, i.e. at a similar velocity and/or a similar distance. By way of example, the displacement of the driver seat can be initiated prior to the retraction of the steering wheel assembly 9 comprising the airbag. Further, the displacement of the driver seat and retraction of the steering wheel assembly 9 comprising an airbag respectively can end at different time points. However, for at least a part of the displacements, both the driver seat and the steering wheel assembly 9 comprising an airbag move. The steering wheel assembly 9 comprising an airbag is preferably not displaced at a lower velocity than the velocity of the head 5 and/or upper body of the driver 7 of the vehicle when the head 5 of the driver 7 has reached the inflated airbag of the steering wheel assembly 9. The driver seat and the steering wheel assembly 9 comprising an airbag can be displaced simultaneously, e.g. starting when the head 5 of the driver 7 reaches the inflated airbag of the steering wheel assembly. In this way, the strain on the body of the driver is reduced.

The method as described herein is performed by a system, e.g. as described herein.

Figure 3A:
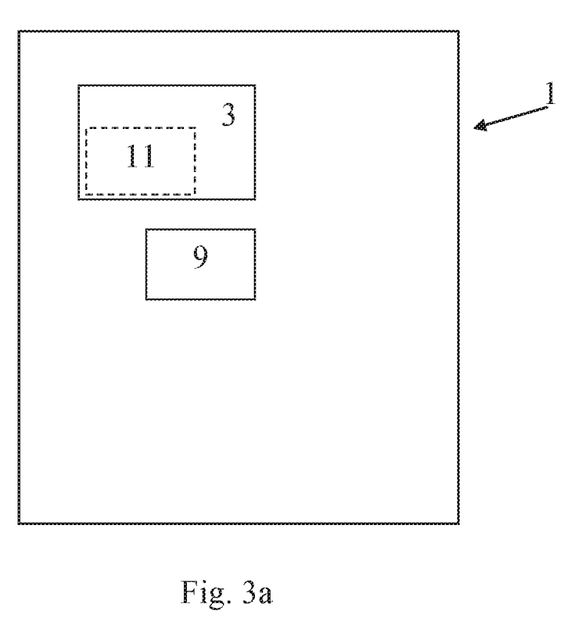
FIG. 3a illustrates a vehicle with a system according to an embodiment of the present disclosure.

FIG. 3a illustrates a schematic drawing of a vehicle 1 according to the invention. The vehicle 1 comprises a collision impact force reduction system 3 according to an embodiment of the present invention. The collision impact force reduction system 3 is adapted to:

determine a smallest relative distance D between the head 5 of a driver 7 of the vehicle 1 and the steering wheel assembly 9 comprising an airbag of the vehicle 1, see FIG. 1a, obtain information of an imminent frontal collision, the collision being at least partly frontal, compare the smallest relative distance D to a pre-defined threshold, when the smallest relative distance D is equal to or less than the pre-defined threshold, and initiate a forward displacement of a driver seat of the vehicle 1 and a retraction of the steering wheel assembly 9 comprising an airbag, preferably a retraction along a steering column of the steering wheel assembly, see FIG. 1c.

The pre-defined threshold can be in the range of 0 to 20 cm, preferably 0 to 10 cm, more preferably 0 to 5 cm, most preferably 0 to 1 cm.

Optionally, the pre-defined threshold is set to 0 cm, or substantially 0 cm.

The collision impact force reduction system 3 is adapted to obtain information comprising the position(s) of the head 5 of a driver 7 of the vehicle 1 and/or the steering wheel assembly 9 comprising an airbag and, on the basis of this information, determine the smallest relative distance D between the head 5 of a driver 7 of the vehicle 1 and the steering wheel assembly 9 comprising an airbag of the vehicle 1.

In FIG. 3a, the collision impact force reduction system 3 is illustrated comprising a vehicle interior sensor set 11. The collision impact force reduction system 3 is then adapted to obtain information comprising the position(s) of the head 5 of a driver 7 of the vehicle 1 and/or the steering wheel assembly 9 comprising an airbag from the vehicle interior sensor set 11. Hence, the vehicle interior sensor set 11 is adapted to determine the position(s) of the head 5 of a driver 7 of the vehicle 1 and/or the steering wheel assembly 9 comprising an airbag.

The vehicle interior sensor set 11 comprises at least one vehicle interior sensor. Purely by way of example, the vehicle interior sensor may be an optical sensor such as camera located in the steering wheel and directed towards the driver. By way of another example, the vehicle interior sensor set 11 can comprise sensors located at two different positions in the vehicle interior. In this way, the position of the head 5 of a driver 7 of the vehicle 1 can be calculated with respect to the vehicle interior. For example, two eye movement sensors or an eye movement sensor combined with a camera can be utilized to position the head 5 of a driver 7 with respect to the vehicle interior.

The steering wheel assembly 9 is typically moved according to the preferences of a driver 7 of the vehicle 1 in a displacement which can be divided in two dimensions. Thus, optionally or as a complement, a two dimensional grid can be created that can be used to calculate the position of the steering wheel assembly 9 comprising an airbag.

Further, not illustrated, information comprising the position(s) can be obtained from a vehicle information system and/or sensors, possibly primarily intended for other purposes, but which can also be utilized for the purposes of determining a smallest relative distance D between the head 5 of a driver 7 of the vehicle 1 and the steering wheel assembly 9 comprising an airbag.

Figure 3B:
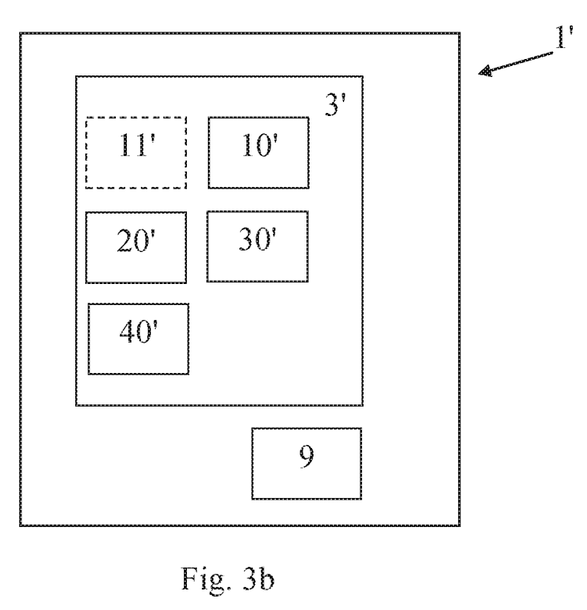
FIG. 3b illustrates a vehicle with a system according to another embodiment of the present disclosure.

With reference to FIG. 3b, a vehicle 1' comprising a collision impact force reduction system 3' according to an embodiment is illustrated. The collision impact force reduction system 3' comprises, a determination unit 10' being adapted to determine the smallest relative distance D between the head 5 of a driver 7 of the vehicle 1 and the steering wheel assembly 9 comprising an airbag of the vehicle 1, see FIG. 1a, a receiving unit 20' being adapted to obtain information of an imminent collision, the collision being at least partly frontal, a processing unit 30' being adapted to compare the smallest relative distance D to a pre-defined threshold and to determine when the smallest relative distance D is equal to or less than the pre-defined threshold, and a control unit 40' being adapted initiate the forward displacement of the driver seat of the vehicle 1 and the retraction of the steering wheel assembly 9 comprising an airbag, preferably a retraction along the steering column of the steering wheel assembly, see FIG. 1c.

Optionally, the collision impact force reduction system 3' can comprise one or more of the determination unit 10', receiving unit 20', processing unit 30' and control unit 40'.

The collision impact force reduction system 3' is depicted comprising a vehicle interior sensor set 11', similar as for the embodiment illustrated in FIG. 3a.

The collision impact force reduction system 3, 3' illustrated in FIGS. 3a and 3b can be adapted to determine the smallest relative distance D between the head 5 of a driver 7 of the vehicle 1 and the steering wheel assembly 9 comprising an airbag of the vehicle 1 continuously during driving of the vehicle 1. Hence, the relative distance is determined all the time during driving of the vehicle, e.g. at a frequency in the range of from 50 Hz to 200 Hz. The smallest relative distance D may be determined at a highest frequency possible for the system. Further, the determination of the smallest relative distance can be set to be carried out continuously first when the vehicle velocity exceeds a pre-determined minimum value, for example 20 or 30 or 40 or 50 km/h. In this way, the continuous determination of a smallest relative distance D is carried out at vehicle velocities for which it is assumed to be desirable to activate the collision impact force reduction system 3.

The collision impact force reduction system 3, 3' is adapted to displace the steering wheel assembly 9 comprising an airbag and the driver seat of the vehicle 1 at least partly simultaneously, preferably synchronized, in a way described above.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. A method for collision impact force reduction for a vehicle, said method comprising a) determining a smallest relative distance (D) between a head of a driver of said vehicle and an inflated airbag of a steering wheel assembly of said vehicle, b) obtaining information of an imminent collision, said collision being at least partly frontal, c) comparing said smallest relative distance (D) to a pre-defined threshold, d) when said smallest relative distance (D) is equal to or less than said pre-defined threshold, initiating a forward displacement of a driver seat of said vehicle and a retraction of said steering wheel assembly comprising said airbag along a steering column of said steering wheel assembly.

2. The method according to claim 1, wherein said pre-defined threshold is in the range of 0 to 20 cm.

3. The method according to claim 1, wherein said pre-defined threshold is 0 cm.

4. The method according to claim 1, wherein said method comprises carrying out step a) continuously during driving of said vehicle.

5. The method according to claim 1, wherein said method comprises obtaining information comprising the position(s) of said head of said driver of said vehicle and/or said steering wheel assembly comprising said airbag and, on the basis of said information, carrying out step a) of said method.

6. The method according to claim 5, wherein said information is obtained from a vehicle interior sensor set comprising at least one vehicle interior sensor, said vehicle interior sensor set being adapted to determine the position(s) of said head of said driver of said vehicle and/or said steering wheel assembly comprising said airbag.

7. The method according to claim 1, wherein said steering wheel assembly comprising said airbag and said driver seat of said vehicle are displaced at least partly simultaneously, preferably synchronized.

8. A collision impact force reduction system for a vehicle, said system being adapted to
   determine a smallest relative distance (D) between a head of a driver of a vehicle and an inflated airbag of a steering wheel assembly of said vehicle,
   obtain information of an imminent frontal collision, said collision being at least partly frontal,
   compare said smallest relative distance (D) to a pre-defined threshold,
   when said smallest relative distance (D) is equal to or less than said pre-defined threshold, initiate a forward displacement of a driver seat of said vehicle and a retraction of said steering wheel assembly comprising said airbag, preferably a retraction along a steering column of said steering wheel assembly.

9. The collision impact force reduction system according to claim 8, wherein said pre-defined threshold is in the range of 0 to 20 cm.

10. The collision impact force reduction system according to claim 8, wherein said pre-defined threshold is 0 cm.

11. The collision impact force reduction system according to claim 8, wherein said collision impact force reduction system is adapted to determine said smallest relative distance (D) between said head of said driver of said vehicle and said steering wheel assembly comprising said airbag of said vehicle continuously during driving of said vehicle.

12. The collision impact force reduction system according to claim 8, wherein said collision impact force reduction system is adapted to obtain information comprising the position(s) of said head of said driver of said vehicle and/or said steering wheel assembly comprising said airbag and, on the basis of said information, determine said smallest relative distance (D) between said head of said driver of said vehicle and said steering wheel assembly comprising said airbag of said vehicle.

13. The collision impact force reduction system according to claim 12, wherein said collision impact force reduction system comprises a vehicle interior sensor set comprising at least one vehicle interior sensor, said collision impact force reduction system being adapted to obtain said information from said vehicle interior sensor set, said vehicle interior sensor set being adapted to determine the position(s) of said head of said driver of said vehicle and/or said steering wheel assembly.

14. The collision impact force reduction system according to claim 8, wherein said collision impact force reduction system is adapted to displace said steering wheel assembly comprising said airbag and said driver seat of said vehicle at least partly simultaneously, preferably synchronized.

15. A vehicle comprising a collision impact force reduction system according to claim 8.

16. The method according to claim 1, further comprising determining said smallest relative distance (D) between said head of said driver of said vehicle and said inflated airbag of said steering wheel assembly of said vehicle when said vehicle exceeds a pre-defined velocity.

17. The collision impact force reduction system according to claim 8, wherein said collision impact force reduction system is adapted to determine said smallest relative distance (D) between said head of said driver of said vehicle and said inflated airbag of said steering wheel assembly of said vehicle when said vehicle exceeds a pre-defined velocity.

\* \* \* \* \*